United States Patent
Acharya

(10) Patent No.: US 7,158,178 B1
(45) Date of Patent: *Jan. 2, 2007

(54) METHOD OF CONVERTING A SUB-SAMPLED COLOR IMAGE

(75) Inventor: Tinku Acharya, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/461,068

(22) Filed: Dec. 14, 1999

(51) Int. Cl.
*H04N 3/14* (2006.01)

(52) U.S. Cl. .................. 348/280; 348/234; 382/167

(58) Field of Classification Search ............. 348/222.1, 348/234–238, 280, 426.1, 427.1, 429.1, 437.1, 348/438.1, 441, 458, 459; 358/518, 448, 358/451; 382/162, 166, 232, 240, 248, 250, 382/298

See application file for complete search history.

(56) References Cited

U.S. PATENT DOCUMENTS

| | | | |
|---|---|---|---|
| 4,642,678 A | | 2/1987 | Cok |
| 5,014,134 A | | 5/1991 | Lawton et al. |
| 5,321,776 A | | 6/1994 | Shapiro |
| 5,392,255 A | | 2/1995 | LeBras et al. |
| 5,398,066 A | | 3/1995 | Martinez-Uriegas et al. |
| 5,406,306 A | * | 4/1995 | Siann ................... 345/546 |
| 5,428,465 A | * | 6/1995 | Kanamori ................ 358/518 |
| 5,491,561 A | | 2/1996 | Fukuda |
| 5,541,653 A | | 7/1996 | Peters et al. |
| 5,574,572 A | * | 11/1996 | Malinowski ............ 382/298 |
| 5,602,589 A | | 2/1997 | Vishwanath et al. |
| 5,706,220 A | | 1/1998 | Vafai et al. |
| 5,729,691 A | * | 3/1998 | Agarwal ................. 709/247 |
| 5,737,448 A | | 4/1998 | Gardos |
| 5,832,120 A | * | 11/1998 | Prabhakar ............... 382/233 |
| 5,875,122 A | | 2/1999 | Acharya |
| 5,892,847 A | | 4/1999 | Johnson |
| 5,901,242 A | | 5/1999 | Crane et al. |
| 5,995,210 A | | 11/1999 | Acharya |
| 6,002,446 A | * | 12/1999 | Eglit ..................... 348/581 |
| 6,009,201 A | | 12/1999 | Acharya |
| 6,009,206 A | | 12/1999 | Acharya |
| 6,047,303 A | | 4/2000 | Acharya |
| 6,091,851 A | | 7/2000 | Acharya |
| 6,094,508 A | | 7/2000 | Acharya et al. |
| 6,108,453 A | | 8/2000 | Acharya |
| 6,124,811 A | | 9/2000 | Acharya et al. |
| 6,125,201 A | * | 9/2000 | Zador ..................... 382/166 |
| 6,130,960 A | | 10/2000 | Acharya |
| 6,151,069 A | | 11/2000 | Dunton et al. |
| 6,151,415 A | | 11/2000 | Acharya et al. |

(Continued)

OTHER PUBLICATIONS

Acharya, et al., "A New Block Matching Based Color Interpolation Algorithm", Intel Corporation, Digital Imaging and Video Division, Chandler, AZ, 3 Pgs.

(Continued)

*Primary Examiner*—Ngoc-Yen Vu
*Assistant Examiner*—Daniel Pasiewicz
(74) *Attorney, Agent, or Firm*—Sharon Wong

(57) ABSTRACT

A method of converting from a sub-sampled color image in a first color space format to a full color image in a second color space format includes the following. A sub-sampled color image in a first color space format is transformed to a second color space format. At least one color plane of the transformed image is upscaled, the one color plane corresponding to one of the color space dimensions of the second color space format, to provide the full color image in the second color space format. Of course, many other embodiments other than the preceding embodiment are also within the scope of the present invention.

19 Claims, 4 Drawing Sheets

U.S. PATENT DOCUMENTS

| | | | |
|---|---|---|---|
| 6,154,493 | A | 11/2000 | Acharya et al. |
| 6,166,664 | A | 12/2000 | Acharya |
| 6,178,269 | B1 | 1/2001 | Acharya |
| 6,195,026 | B1 | 2/2001 | Acharya |
| 6,208,350 | B1 * | 3/2001 | Herrera ............... 345/582 |
| 6,215,908 | B1 | 4/2001 | Pazmino et al. |
| 6,215,916 | B1 | 4/2001 | Acharya |
| 6,229,578 | B1 | 5/2001 | Acharya et al. |
| 6,233,358 | B1 | 5/2001 | Acharya |
| 6,236,433 | B1 | 5/2001 | Acharya et al. |
| 6,236,765 | B1 | 5/2001 | Acharya |
| 6,259,819 | B1 * | 7/2001 | Andrew et al. ......... 382/248 |
| 6,275,206 | B1 | 8/2001 | Tsai et al. |
| 6,285,796 | B1 | 9/2001 | Acharya et al. |
| 6,292,114 | B1 | 9/2001 | Tsai et al. |
| 6,301,392 | B1 | 10/2001 | Acharya |
| 6,348,929 | B1 | 2/2002 | Acharya et al. |
| 6,356,276 | B1 | 3/2002 | Acharya |
| 6,366,692 | B1 | 4/2002 | Acharya |
| 6,366,694 | B1 | 4/2002 | Acharya |
| 6,373,481 | B1 | 4/2002 | Tan et al. |
| 6,377,280 | B1 | 4/2002 | Acharya et al. |
| 6,381,357 | B1 | 4/2002 | Tan et al. |
| 6,392,699 | B1 | 5/2002 | Acharya |
| 6,411,333 | B1 * | 6/2002 | Auld et al. ............ 348/441 |
| 6,535,648 | B1 | 3/2003 | Acharya |
| 6,563,537 | B1 | 5/2003 | Kawamura et al. |
| 6,563,538 | B1 | 5/2003 | Utagawa |
| 6,570,616 | B1 | 5/2003 | Chen |
| 2001/0019630 | A1 | 9/2001 | Johnson |

OTHER PUBLICATIONS

James Adams, Jr., "Interactions Between Color Plane Interpolation and Other Image Processing Functions in Electronic Photography".

Eastman Kodak Company, Imaging Research and Advanced Development, Rochester, NY, SPIE, vol. 2416, pp. 144–151.

Zhao, et al., "A Fuzzy Logic Approach to Image Segmentation", Dept. of Electrical Engineering, Utah State University, Logan, UT, 1994 IEEE, pp. 337–340.

"Image Processing and Machine Vision", Chapter 4, pp. 327–330.

Rosenfeld, "Fuzzy Digital Topology", Computer Science Center, University of Maryland, College Park, Maryland, Inform. Control, vol. 40, No. 1, Jan. 1979, Copyright 1979 by Academic Press, Inc. pp. 331–339.

Rosenfeld, "The Fuzzy Geometry of Image Subsets", Center for Automation Research, University of Maryland, College Park, MD, Pattern Recognition Letters, vol. 2, Sep. 1984, pp. 340–346.

Dyer, et al., "Thinning Algorithms For Gray–Scale Pictures", IEEE Trans. Pattern Analysis and Machine Intelligence, vol. PAMI–1, No. 1, Jan. 1979, pp. 347–348.

Pal, et al., "Image Enhancement Using Smoothing With Fuzzy Sets", IEEE Transactions on Systems, Man, and Cybernetics, vol.SMC–11, No. 7, Jul. 1981, pp. 349–356.

Li, et al., "Fast and Reliable Image Enhancement Using Fuzzy Relaxation Technique", IEEE Transactions on Systems, Man, and Cybernetics, vol. 19, No. 5, Sep./Oct. 1989, pp. 357–361.

Tanaka, et al., "A Study on Subjective Evaluations of Printed Color Images" Image & Information Research Institute, Dai Nippon Printing Co., Tokyo, Japan, vol. 5, No. 3, Copyright 1991 by Elsevier Science Publishing Co., pp. 362–368.

Pal, et al., "Image Enhancement and Thresholding by Optimization of Fuzzy Compactness", Center for Automation Research, University of Maryland, College Park, MD, Pattern Recognition Letters, vol. 7, Feb. 1988, pp. 36–378.

Lim, et al., "On the Color Image Segmentation Algorithm Based on the Thresholding and the Fuzzy C–Means Techiques", Dept. of Control and Instrumentation Engineering, Seoul National University, Kwanad–Ku, Seoul, Korea, Pattern Recognition, vol. 23, No. 9, Copyright 1990, Pergamon Press, pp. 379–396.

Huntsberger, et al., "Representation of Uncertainty in Computer Vision Using Fuzzy Sets", IEEE Transactions on Computers, vol. C–35, No. 2, Feb. 1986, pp. 397–407.

H. H. Nguyen, P. Cohen, "Gibbs Random Fields, Fuzzy Clustering, and the Unsupervised Segmentation of Textured Images," Graphical Models and Image Processing, vol. 55, No. 1, pps. 1–19, Jan. 1993.

C. Jawahar, A. Ray, "Techniques and Applications of Fuzzy Statistics in Digital Image Analysis," Fuzzy Theory Systems: Techniques and Applications, vol. 2, pps. 759–778, 1999.

S. K. Pal, A. Ghosh, "Image Segmentation Using Fuzzy Correlation," Information Sciences No. 62, pps. 223–250, 1992.

U.S. patent application Ser. No. 08/130,243, Acharya, filed Aug. 6, 1998.

U.S. patent application Ser. No. 08/963,335, Goldstein et al., filed Nov. 3, 1997.

U.S. patent application Ser. No. 08/885,415, Acharya, filed Jun. 30, 1997.

U.S. patent application Ser. No. 09/008,131, Achara et al., filed Jan. 16, 1998.

U.S. patent application Ser. No. 09/018,601, Acharya, filed Feb. 4, 1998.

U.S. patent application Ser. No. 09/034,625, Acharya, filed Mar. 4, 1998.

U.S. patent application Ser. No. 09/163,022, Acharya et al., filed Sep. 29, 1998.

U.S. patent application Ser. No. 08/978,786, Acharya et al., filed Nov. 26, 1997.

U.S. patent application Ser. No. 09/482,551, Acharya et al., filed Jan. 13, 2000.

U.S. patent application Ser. No. 08/963,525, Acharya, filed Nov. 3, 1997.

S. K. Pal, N. R. Pal, "Segmentation Based on Measures of Contrast, Homogeneity, and Region Size," IEEE Transactions on Systems, Man, and Cybernetics, vol. SMC–17, No. 5, pps. 857–868, Sep./Oct. 1987.

M. Trivedi, J. Bezdek, "Low–Level Segmentation of Aerial Images with Fuzzy Clustering," IEEE, vol. SMC–16, No. 4, pps. 589–597, Jul./Aug. 1986.

H.J. Zimmermann, "Fuzzy Set Theory and Its Applications (Second, Revised Edition)," Allied Publishers Limited, pps. 34–35, 46–49.

U.S. patent application Ser. No. 09/482,552, Acharya, filed Jan. 13, 2000.

U.S. patent application Ser. No. 08/114,720, Acharya, filed Jul. 13, 1998.

U.S. patent application Ser. No. 09/050,743, Acharya, filed Mar. 30, 1998.

U.S. patent application Ser. No. 09/963,097, Booth et al., filed Nov. 3, 1997.

U.S. patent application Ser. No. 08/986,761, Acharya et al., filed Dec. 8, 1997.

U.S. patent application Ser. No. 09/154,176, Acharya, filed Sep. 16, 1998.
U.S. patent application Ser. No. 08/963,334, Acharya, filed Nov. 3, 1997.
U.S. patent application Ser. No. 08/986,461, Acharya et al., Dec. 8, 1997.
U.S. patent application Ser. No. 09/258,636, Acharya et al., filed Feb. 26, 1999.
U.S. patent application Ser. No. 09/048,901, Acharya, filed Mar. 26, 1998.
U.S. patent application Ser. No. 09/040,806, Acharya, filed Mar. 18, 1998.
U.S. patent application Ser. No. 09/301,753, Acharya et al., filed Apr. 29, 1999.
U.S. patent application Ser. No. 09/083,383, Acharya et al., filed May 21, 1998.
U.S. patent application Ser. No. 09/109,475, Acharya, filed Jul. 2, 1998.
U.S. patent application Ser. No. 09/140,517, Acharya, filed Aug. 26, 1998.
U.S. patent application Ser. No. 09/129,728, Acharya, filed Aug. 5, 1998.
U.S. patent application Ser. No. 09/146,159, Acharya, filed Sep. 3, 1998.
U.S. patent application Ser. No. 09/152,703, Acharya, filed Sep. 14, 1998.
U.S. patent application Ser. No. 09/126,203, Bawolek et al., filed Jul. 30, 1998.
U.S. patent application Ser. No. 09/258,118, Vavro et al., filed Feb. 24, 1999.
U.S. patent application Ser. No. 09/207,753, Acharya, filed Dec. 8, 1998.
U.S. patent application Ser. No. 09/272,751, Acharya et al., filed Mar. 17, 1999.
U.S. patent application Ser. No. 09/165,511, Acharya et al., filed Oct. 2, 1998.
U.S. patent application Ser. No. 09/199,836, Bawolek et al., filed Nov. 24, 1998.
U.S. patent application Ser. No. 09/320,192, Acharya et al., May 26, 1999.
U.S. patent application Ser. No. 09/211,309, Acharya et al., filed Dec. 14, 1998.
U.S. patent application Ser. No. 09/438,091, Acharya et al., filed Nov. 10, 1999.
U.S. patent application Ser. No. 09/342,863, Acharya, et al., filed Jun. 29, 1999.
U.S. patent application Ser. No. 09/191,310, Acharya et al., filed Nov. 13, 1998.
U.S. patent application Ser. No. 09/383,117, Acharya et al., filed Aug. 25, 1999.
U.S. patent application Ser. No. 09/291,810, Acharya, filed Apr. 14, 1999.
U.S. patent application Ser. No. 09/292763, Acharya et al., filed Apr. 14, 1999.
U.S. patent application Ser. No. 09/390,255, Acharya et al., filed Sep. 3, 1999.
U.S. patent application Ser. No. 09/329,632, Acharya et al., filed Jun. 10, 1999.
U.S. patent application Ser. No. 09/328,935, Acharya et al., filed Jun. 9, 1999.
U.S. patent application Ser. No. 09/359,831, Acharya et al., filed Jul. 23, 1999.
U.S. patent application Ser. No. 09/359,523, Acharya et al., filed Jul. 23, 1999.
U.S. patent application Ser. No. 09/406,032, Acharya, filed Sep. 27, 1999.
U.S. patent application Ser. No. 09/410,800, Acharya et al., filed Oct. 1, 1999.
U.S. patent application Ser. No. 09/411,697, Acharya et al., filed Oct. 1, 1999.
U.S. patent application Ser. No. 09/461,080, Acharya, filed Dec. 14, 1999.
U.S. patent application Ser. No. 09/461,068, Acharya, filed Dec. 14, 1999.
U.S. patent application Ser. No. 09/432,337, Acharya, filed Nov. 2, 1999.
U.S. patent application Ser. No. 09/429,058, Acharya et al., filed Oct. 29, 1999.
U.S. patent application Ser. No. 09/467,487, Acharya et al., filed Dec. 20, 1999.
U.S. patent application Ser. No. 09/467,611, Acharya et al., filed Dec. 20, 1999.
U.S. patent application Ser. No. 09/473,643, Acharya et al., filed Dec. 28, 1999.
U.S. patent application Ser. No. 09/494,087, Acharya, filed Jan. 28, 2000.
U.S. patent application Ser. No. 09/507,213, Acharya et al., filed Feb. 25, 2000.
U.S. patent application Ser. No. 09/507,399, Acharya et al., filed Feb. 25, 2000.
U.S. patent application Ser. No. 09/519,135, Acharya et al., filed Mar. 6, 2000.
U.S. patent application Ser. No. 09/519,874, Acharya et al., filed Mar. 6, 2000.

* cited by examiner

| R | G1 | R | G1 | R | G1 | R | G1 | ••• | ••• |
|---|---|---|---|---|---|---|---|---|---|
| G2 | B | G2 | B | G2 | B | G2 | B | ••• | ••• |
| R | G1 | R | G1 | R | G1 | R | G1 | ••• | ••• |
| G2 | B | G2 | B | G2 | B | G2 | B | ••• | ••• |
| R | G1 | R | G1 | R | G1 | R | G1 | ••• | ••• |
| G2 | B | G2 | B | G2 | B | G2 | B | ••• | ••• |
| R | G1 | R | G1 | R | G1 | R | G1 | ••• | ••• |
| G2 | B | G2 | B | G2 | B | G2 | B | ••• | ••• |
| ⋮ | ⋮ | ⋮ | ⋮ | ⋮ | ⋮ | ⋮ | ⋮ | ••• | ••• |
| ⋮ | ⋮ | ⋮ | ⋮ | ⋮ | ⋮ | ⋮ | ⋮ | ••• | ••• |

Bayer Pattern

FIG. 1
(PRIOR ART)

| B(0,0) | B(0,1) | B(0,2) | B(0,3) | ..... |
|--------|--------|--------|--------|-------|
| B(1,0) | B(1,1) | B(1,2) | B(1,3) | ..... |
| B(2,0) | B(2,1) | B(2,2) | B(2,3) | ..... |
| B(3,0) | B(3,1) | B(3,2) | B(3,3) | ..... |
| ⋮ | ⋮ | ⋮ | ⋮ | ..... |

$$B(m,n) = \begin{array}{|c|c|} \hline R & G1 \\ \hline G2 & B \\ \hline \end{array}$$

FIG. 4

METHOD OF CONVERTING A SUB-SAMPLED COLOR IMAGE

RELATED APPLICATION

This patent application is related to U.S. Pat. No. 6,628,827, titled "Method of Upscaling A Color Image," by Acharya, assigned to the assignee of the current invention and herein incorporated by reference.

BACKGROUND

This disclosure relates to color conversion and, more particularly, to converting from a sub-sampled color image in a first color space format to a full color image in a second color space format.

As is well-known, in a variety of circumstances, it is a desirable to apply a technique to convert from a sub-sampled color image to a full color image. For example, for a camera or other imager that has the capability of creating a color image, typically it is too expensive to have the capability to capture three independent color pixel signal values for each pixel location of an image of a particular size or dimension. Therefore, more typically, a sub-sampled color image is captured and the missing color pixel signal values at each pixel location are computed using a variety of techniques. In other words, each pixel location may have a single color signal value rather than three independent color signal values, for example. A need continues to exist for techniques for creating a full color image of good quality from a sub-sampled color image.

BRIEF DESCRIPTION OF DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a schematic diagram illustrating a sub-sampled color image, such as a Bayer pattern color image;

FIG. 4 is an alternative way to represent the sub-sampled color image of FIG. 1.

DETAILED DESCRIPTION

Figure 2:
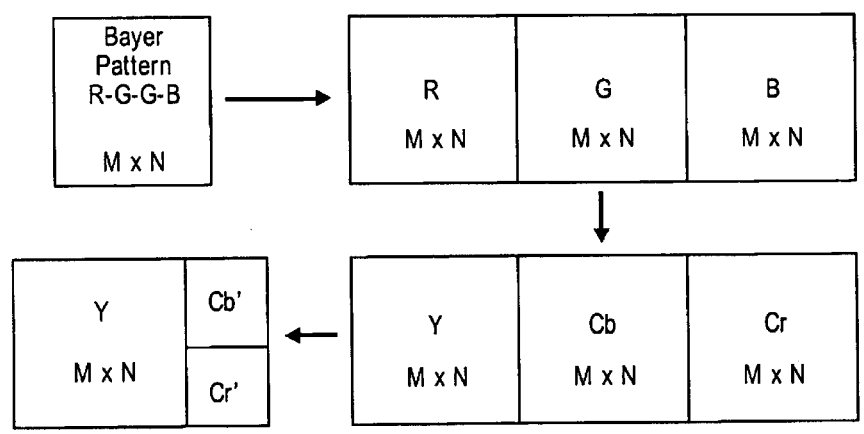
FIG. 2 is a schematic diagram illustrating one technique for producing a full color image from a sub-sampled color image and subsequently converting to another color space format.

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

As previously indicated, for a color image, typically each pixel signal value is represented by three independent color components, such as a red component, a green component, and a blue component, for example. However, the invention is not limited in scope to these color components or to this particular color space format. Ideally, three image sensors would be used to capture the three color components. However, the use of three sensors in a single image capture device is typically expensive and also may not be suitable for use in low power handheld devices, such as a mobile handset designed to display such color images, for example.

In order to reduce cost, typically the color image is captured in a sub-sampled form using a single sensor in each pixel location with a suitable color filter array (CFA) "on top" of the sensor. Of course, the invention is not limited in scope to use with such an image capture device, however. Nonetheless, in such an approach, each pixel location comprises only one color component signal value, thereby forming a type of sub-sampled color image. For example, in one approach, each pixel signal value may comprise either a red color signal value, a green color signal value, or a blue color signal value represented by eight binary digital signals or bits. Although the invention is not limited in scope in this respect, one such pattern is a Bayer pattern, as illustrated schematically in FIG. 1.

Of course, for a color image formed using three color sensors in each pixel location, each location would include signal information for all three independent color components. Therefore, typically, for a color image captured by the latter device, each pixel is represented by a 24 bit color signal, 8 bits for each of the red, green, and blue color components, for example. Again, the invention is not restricted in scope by this example; however, in order to produce such an image from a device employing one color sensor in each pixel location, for example, signal interpolation would typically be employed. In one example of signal interpolation, the two missing color components for each pixel location are obtained by using color signal information provided by neighboring pixel signal values.

If a full color image is obtained in this manner, a transformation into a different color space format may then be employed. For example, it may be desirable to comply with certain image processing specifications and/or standards, such as those provided by the International Telecommunications Union (ITU) or the International Standards Organization (ISO), although the invention is not limited in scope in this respect. Likewise, it is also typical to represent color images in a luminance-chrominance (L-C) form in order to reduce the storage requirements by sub-sampling redundant color signal information that may be present in the image, typically in the chrominance color components. One widely used L-C color space format is the Y-Cr-Cb 4:2:0 representation, although, again, this is just an example.

Disadvantages of current techniques to produce a full color image from a sub-sampled color image include (1) the loss of signal information as a result of applying the particular technique and/or (2) high computational complexity, which also may typically consume excessive power when employed or performed by a computing engine, and/or (3) internal buffering large enough to store the signal information during and after processing. These disadvantages will be explained in more detail hereinafter. An embodiment of converting from a sub-sampled color image to a full color image in accordance with the present invention may avoid these disadvantages.

As is well-known, a color interpolation method or process, such as described in "Method of Interpolating Color Pixel Signals from a Subsampled Color Image," by Acharya et al., filed on Oct. 1, 1999, U.S. patent application Ser. No. 09/410,800, assigned to the assignee of the present invention, for example, generates a full color digital image comprising three color planes, red, green, and blue, each of size M×N from a Bayer pattern sub-sampled image by generating the missing two color components for each pixel location. Of course, this is just one example of a color interpolation process, and the invention is not limited in scope to this or any other particular approach. There are a wide number of color interpolation techniques that may be employed. Typically, the color signal information of the neighboring pixels are employed to generate the missing color signal information for each pixel. A simple approach to implement would be to employ the median of the neighboring pixels. Of course, more complex approaches may also be employed. FIG. 2 illustrates a process in which a sub-sampled image is interpolated to produce a full color image.

Subsequently, for the approach illustrated in FIG. 2, an interpolated full color image is converted to a sub-sampled luminance-chrominance (L-C) color space format, such as Y-Cr-Cb 4:2:0, to meet color specifications or criteria, such as provided, for example, in the H.263 ITU standard, applied in video conferencing applications. Of course, the invention is not restricted in scope in this respect. The color space format conversion from 24 bit RGB color space format to 12 bit Y-Cr-Cb 4:2:0 color space format is done using the following transformation:

$$Y(I,J)=0.299R(I,J)+0.587G(I,J)+0.114B(I,J)$$

$$Cr(I,J)=-0.169R(I,J)-0.331G(I,J)+0.500B(I,J)$$

$$Cb(I,J)=0.500R(I,J)-0.419G(I,J)-0.081B(I,J) \quad [1]$$

where R,G, and B denote different color planes in the RGB color space format, Y, Cr, and Cb denote different color planes in the Y-Cr-Cb 4:2:0 color space format, and I,J denote pixel locations.

The Cr and Cb image planes are then, in this particular approach, decimated by dropping alternate rows and columns from each chrominance plane (Cb and Cr), as illustrated by Cr' or Cb' in FIG. 2. This generates the Y-Cr-Cb image in 4:2:0 color space (12 bit color) format. The reason for 12 bits for each pixel in Y-Cr-Cb 4:2:0 color space is that for every 4 luminance (Y) pixels (1 byte each for each luminance value) in this format there is 1 value (1 byte each) for each corresponding chrominance channel (Cb and Cr in this example). Hence, 4 full color pixels in this format are represented by 6 bytes or 48 bits. As a result, each pixel in Y-Cr-Cb color space format is considered to have 12 bits.

Assume that the average number of operations to recover each missing color signal value in a particular pixel location is "K", when using a known color interpolation technique. Then, to recover two missing color space components for each pixel location, the total number of operations to restore the full color image using this approach is 2K×(M×N), where "×" denotes multiplication. The total number of multiplications for color conversion is 9M×N, and the number of additions is 6M×N. Therefore, ignoring the computation for sub-sampling, the typical number of operations for color interpolation followed by color conversion is more than (2K+15)×M×N. Likewise, the memory buffer size employed for hardware and/or software implementation of this approach is 3M×N.

Figure 3:
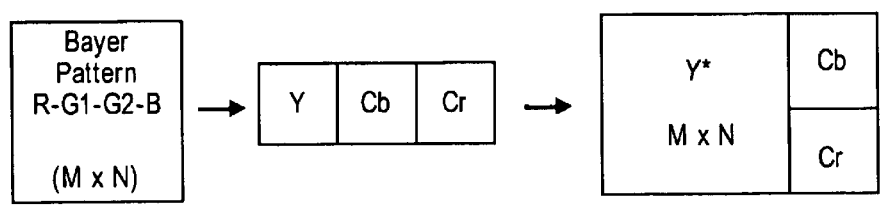
FIG. 3 is a schematic diagram illustrating a technique of converting from a sub-sampled color, image to a full color image in accordance with the present invention.

FIG. 3 illustrates an embodiment in accordance with the present invention. Of course, the invention is not limited in scope to this particular embodiment. In this embodiment, however, a sub-sampled color image in a first color space format, such as a Bayer pattern in RGB color space, is transformed to a second color space format, such as Y-Cr-Cb color space format. In this particular embodiment, the Bayer pattern of size M×N is converted to an image of size M/2×N/2 using an integrated approach that avoids computationally complex color interpolation methodologies and the decimation operation previously described. Then, at least one of the color space dimensions in the transformed image is "upscaled" to provide a full color image in a second color space format.

In this context, the term upscaled refers to a process applied to a color plane of a color dimension in a particular color space format whereby the color signal information in the color plane is retained, but spread or distributed over a color plane of larger dimensions. For example, for the embodiment illustrated in FIG. 3, the Y plane of size M/2×N/2 is upscaled using a discrete wavelet transform (DWT) based upsampling technique in order to generate an M×N Y-Cb-Cr 4:2:0 color image. Of course, the invention is not limited in scope to using the discrete wavelet transform and many other sampling techniques may be employed such as bi-linear interpolation, weighted averaging, etc. An advantage of this particular approach is that the chrominance plane is not decimated and, hence, there is no significant loss of signal information as would typically occur.

To illustrate this particular embodiment in greater detail, FIG. 4 is a schematic diagram that represents the Bayer pattern of FIG. 1 differently than in FIG. 1. Each block B(I,J) represents a 2×2 Bayer pattern as shown in FIG. 4. Integrated color interpolation and color space conversion is accomplished using the previous transformation or equations [1] with the following additional relationships applying also:

$$R(I,J)=R$$

$$G(I,J)=(G1+G2)/2$$

$$B(I,J)=B \quad [2]$$

where R, G1, G2, and B are from the block B(I,J). As a result of this transformation, a Y-Cr-Cb color image of size M/2×N/2 is obtained because each 2×2 Block produces a single pixel signal value in this color space format. The Y plane may then be upsampled to generate the M×N size Y-Cr-Cb 4:2:2 color space format image. One technique for performing this upscaling is described in greater detail in a prior patent application "A DWT-based Up-Sampling Algorithm Suitable For Image Display In An LCD panel," by Acharya, filed on Aug. 5, 1998, U.S. patent application Ser. No. 09/129,728, now U.S. Pat. No. 6,236,765, assigned to the assignee of the present invention, although the invention is not limited in scope in this respect. As previously indicated any one of a number of techniques to perform the upscaling may be employed.

It is noted that the computational complexity of this approach and the amount of storage space utilized is significantly less than the previous approach. As discussed above, the total number of multiplications for an integrated color interpolation and color conversion is 9×(M/2)×(N/2) or (9/4)M×N and a similar number of additions and subtractions. Hence, the total number of operations is 4.5 M×N. In this particular embodiment, for an upscaling operation for the Y plane, the computational complexity is similar to that of color interpolation; however, the upscaling is applied to data of size M/2×N/2. Hence, for upscaling the Y plane, the total number of operations is K×M×N. Hence, the total number of operations for this particular embodiment is (K+4.5)×M×N, which is less than half of the approach previously described in terms of computational complexity.

Likewise, the storage space employed to implement this approach is 1.5M×N or about half of the approach previously described.

As previously indicated, an embodiment of a method of converting from a sub-sampled color image in a first color space format to a full color image in a second color space format in accordance with the invention provides a number of advantages. The color interpolation approach is integrated with the color conversion methodology. As a result, a computationally complex color interpolation scheme is avoided totally with the trade off being the addition of an upscaling scheme applied to a reduced set of data. Because of this integrated approach, pipelining the imaging processing flow, as is desirable in implementing video, for example, is relative straightforward and useful for such applications. The reduction in computational complexity is more than 50%, and in memory storage space is about 50%. Therefore, this approach may be applied to virtually any digital signal processing architecture or similar computing engine and may reduce computational complexities suitable for real-time application and low power applications, such as may be desirable for handheld devices, with generally no significant loss of signal information.

It will, of course, be understood that, although a particular embodiment has just been described, the invention is not limited in scope to a particular embodiment or implementation. For example, one embodiment may be in hardware, whereas another embodiment may be in software. Likewise, an embodiment may be in firmware, or any combination of hardware, software, or firmware, for example. Likewise, although the invention is not limited in scope in this respect, one embodiment may comprise an article, such as a storage medium. Such a storage medium, such as, for example, a CD-ROM, or a disk, may have stored thereon instructions, which when executed by a system, such as a computer system or platform, or an imaging system, may result in a method of upscaling a color image in accordance with the invention, such as, for example, the embodiment previously described.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method of converting from a sub-sampled color image in a first color space format to a full color image in a second color space format comprising:
    transforming the sub-sampled color image in the first color space format to the second color space format; and
    upscaling at least one color plane of the transformed image, the one color plane corresponding to one of the color space dimensions of the second color space format, to provide the full color image in the second color space format, wherein upscaling comprises applying an Inverse discrete wavelet transform to an image decomposed into subbands, at least one of the subbands comprising the at least one color plane of the transformed image.

2. The method of claim 1, wherein the first color space format is the RGB color space format.

3. The method of claim 2, wherein the second color space format is the Y-Cr-Cb 4:2:0 color space format.

4. The method of claim 1, wherein the first and second color space formats comprise two different luminance-chrominance color space formats.

5. The method of claim 1, wherein transforming comprises applying a relationship to at least one pixel value of the image in the first color space format to obtain a pixel value in the second color space format.

6. The method of claim 5, wherein transforming comprises applying the relationship to more than at least one pixel value of the image in the first color space format.

7. The method of claim 5, wherein the relationship is substantially in accordance with the following equations:

$$Y(I,J)=0.299R(I,J)+0.587G(I,J)+0.114B(I,J)$$

$$Cr(I,J)=-0.169R(I,J)-0.331G(I,J)+0.500B(I,J)$$

$$Cb(I,J)=0.500R(I,J)-0.419G(I,J)-0.081B(I,J)$$

where R,G, and B denote different color planes in the RGB color space format, Y, Cr, and Cb denote different color planes in the Y-Cr-Cb 4:2:0 color space format, and I,J denote pixel locations.

8. The method of claim 1, wherein the at least one of the subbands comprises an LL subband of the decomposed image.

9. The method of claim 8, wherein the remaining subbands of the decomposed image comprise only zeros.

10. An article comprising: a storage medium having stored thereon instructions to convert from a sub-sampled color image in a first color space format to a full color image in a second color space format, the instructions, when executed by a system, resulting in:
    transforming the sub-sampled color image in the first color space format to the second color space format; and
    upscaling at least one color plane of the transformed image, the one color plane corresponding to one of the color space dimensions of the second color space format, to provide the full color image in the second color space format, wherein the instructions, when executed, further result in upscaling at least one color plane comprising applying an Inverse discrete wavelet transform to an image decomposed into subbands, at least one of the subbands comprising the at least one color plane of the transformed image.

11. The article of claim 10, wherein the first color space format is the RGB color space format.

12. The article of claim 11, wherein the second color space format is the Y-Cr-Cb 4:2:0 color space format.

13. The article of claim 10, wherein the first and second color space formats comprise two different luminance-chrominance color space formats.

14. The article of claim 10, wherein the instructions, when executed, further result in transforming the color image comprising applying a relationship to at least one pixel value of the image in the first color space format to obtain a pixel value in the second color space format.

15. The article of claim 14, wherein the instructions, when executed, further result in the relationship being applied substantially in accordance with the following equations:

$$Y(I,J)=0.299R(I,J)+0.587G(I,J)+0.114B(I,J)$$

$$Cr(I,J)=-0.169R(I,J)-0.331G(I,J)+0.500B(I,J)$$

$$Cb(I,J)=0.500R(I,J)-0.419G(I,J)-0.081B(I,J)$$

where R,G, and B denote different color planes in the RGB color space format, Y, Cr, and Cb denote different color planes in the Y-Cr-Cb 4:2:0 color space format, and I,J denote pixel locations.

16. The article of claim 11, wherein the instructions, when executed, further result in the at least one of the subbands comprising an LL subband of the decomposed image.

17. The article of claim 16, wherein the instructions, when executed, further result in the remaining subbands of the decomposed image comprise only zeros.

18. A method of converting a subsampled color image transformed to a selected color space format to a full color image in the selected color space format comprising:

appending zero subbands to at least one of the color planes of the transformed color image so that the at least one of the color planes forms an LL subband of a decomposed image and the appended subbands form LH, HL, and LL subbands of a decomposed image; and applying the inverse discrete wavelet transform to the decomposed image so as to form the full color image in the selected color space format.

19. The method of claim 18, wherein the selected color space format comprises the Y-Cr-Cb 4:2:0 color space format.

* * * * *